(12) United States Patent
Zhang et al.

(10) Patent No.: US 8,630,329 B2
(45) Date of Patent: Jan. 14, 2014

(54) HIGH-SPEED SAMPLING AND LOW-PRECISION QUANTIFICATION PULSE ULTRA-WIDEBAND WIRELESS COMMUNICATION METHOD

(75) Inventors: Zaichen Zhang, Nanjing (CN); Guangguo Bi, Nanjing (CN); Xiaohu You, Nanjing (CN); Liang Wu, Nanjing (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 13/498,576

(22) PCT Filed: Sep. 28, 2009

(86) PCT No.: PCT/CN2009/074279
§ 371 (c)(1),
(2), (4) Date: Jun. 5, 2012

(87) PCT Pub. No.: WO2011/035493
PCT Pub. Date: Mar. 31, 2011

(65) Prior Publication Data
US 2012/0230369 A1  Sep. 13, 2012

(51) Int. Cl.
*H04B 1/00* (2006.01)
(52) U.S. Cl.
USPC ........... 375/130; 375/229; 375/131; 375/132; 375/230; 375/231; 375/232; 370/342; 370/206; 370/335
(58) Field of Classification Search
USPC ......... 375/130, 229, 131, 132, 230, 231, 232; 370/342, 206, 335
See application file for complete search history.

(56) References Cited

U.S. PATENT DOCUMENTS

| | | | | |
|---|---|---|---|---|
| 2005/0179585 | A1* | 8/2005 | Walker et al. | 342/134 |
| 2008/0279287 | A1* | 11/2008 | Asahina | 375/242 |
| 2009/0296831 | A1* | 12/2009 | Qi et al. | 375/259 |

FOREIGN PATENT DOCUMENTS

| | | |
|---|---|---|
| CN | 101022280 A | 8/2007 |
| CN | 101425810 A | 5/2009 |
| CN | 101662448 A | 3/2010 |

OTHER PUBLICATIONS

International Search Report, corresponding to PCT/CN2009/074279, dated Jul. 1, 2010, 6 pages.

* cited by examiner

*Primary Examiner* — Zewdu Kassa
(74) *Attorney, Agent, or Firm* — Christie, Parker & Hale, LLP (57) ABSTRACT

For a demand of high speed, low cost and low power loss short distance wireless communication, a high-speed sampling and low-precision quantification pulse ultra-wideband wireless communication method is provided. A baseband narrow pulse sequence is generated at a transmission end using the digital technology by the method, and is transmitted after modulating amplifying and filtering and amplifying at a reception end, after the digital-signal processing of synchronizing, channel estimating, related detecting, and channel decoding, tec, is performed for the quantified data, the transmission information is retrieved. Comparing with the present carrier mechanism UWB wireless communication technology, the method does not need the complex radio frequency processing of orthogonal modulation/demodulation and frequency spectrum moving, etc, the quantification precision of analog-to-digital conversion is also decreased greatly, so the cost and power loss are greatly decreased; comparing with the present pulse mechanism UWB wireless communication technology, the method provided by the present invention greatly increase the data transmission rate, and increases the stability, reliability and integration.

4 Claims, 3 Drawing Sheets

HIGH-SPEED SAMPLING AND LOW-PRECISION QUANTIFICATION PULSE ULTRA-WIDEBAND WIRELESS COMMUNICATION METHOD

CROSS-REFERENCE TO RELATED APPLICATION(S)

This application is a National Phase Patent Application and claims priority to and benefit of International Application Number PCT/CN2009/074279, filed on Sep. 28, 2009, the entire disclosure of which is incorporated herein by reference.

TECHNICAL FIELD

The present invention relates to a method for implementing pulse system high-speed ultra-wideband wireless communication, belonging to the technical field of short-distance wireless communication and information transmission.

BACKGROUND ART

As one of the core technologies widely used for wireless communication in the future, the ultra-wideband (UWB) wireless communication technology has attracted wide attention in recent years, and remarkable progress has been made in its research and development.

The UWB technology is generally divided into two basic implementation modes of pulse system and carrier system. The pulse system UWB transmits information through a base band pulse sequence, has the advantages of simple system structure, low cost, low power consumption and the like, and is mostly applied to the fields of low-speed wireless communication, distance measurement, detection and the like at present. Carrier system UWB adopts mature technologies such as modulation continuous carrier and orthogonal frequency division multiplexing (OFDM), has high frequency spectrum utilization efficiency, and is flexible in use of frequency spectrum sources. At present, the carrier system UWB has developed rapidly in the field of high-speed UWB wireless communication, technical standards based on multiband OFDM schemes have been established around the world, and multiple experimental chips and experimental systems have been launched. But the radio frequency system of the carrier system UWB scheme is much more complicated, implementing radio frequency chips has high difficulty and high cost, and the analog-to-digital conversion unit has large power consumption, so that the cost and the power consumption of the carrier system UWB chip set can not be further reduced to meet the requirements of the markets. In the existing pulse system UWB technology which generally adopts the methods such as peak detection, energy detection, simulation-associated detection at the receiving end can only achieve the functions of low-speed wireless communication and detection, positioning and the like as the performance is limited by simulation processing.

CONTENT OF THE INVENTION

Technical problems: The purpose of the present invention is to provide a high-speed sampling and low-precision quantification pulse ultra-wideband wireless communication method to achieve pulse system high-speed UWB wireless communication, which solves the problems that the prior art of pulse system UWB can only achieve low-speed wireless communication and simultaneously overcomes the problems of high complexity, high cost and the like in the carrier system UWB system.

Technical solution: The high-speed sampling and low-precision quantification pulse ultra-wideband wireless communication method provided in the present invention comprises the following steps: generating a base band pulse sequence with a digital method at a sending end using a frame as the physical layer data transmission basic unit; modulating the baseband pulse sequence using sending data, and performing amplification and bandpass filtering; sending signals which are controlled within the frequency band of 4.2-4.8 GHz after filtering into air via an antenna; filtering and amplifying received signals at a receiving end, then directly performing high-speed sampling and low-precision quantification to convert the signals to digital domains, and designing synchronization, channel estimation and related detecting methods suitable for high-speed sampling, low-precision quantification signals to process signals converted to the digital domains and recover sent information.

The sending end consists of a channel encoder, a framer, a digital pulse generation and modulation device, a sending end amplifier, a sending end bandpass filter and a sending antenna which are sequentially connected; the receiving end consists of a receiving antenna, a receiving end bandpass filter, a low-noise amplifier, an analog to digital converter, a digital detector and a channel decoder which are sequentially connected.

Figure 1:
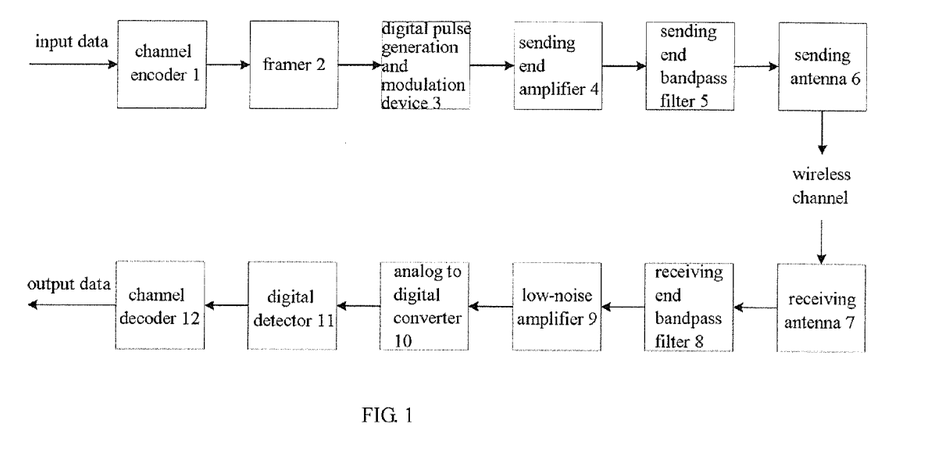
FIG. 1 is an entire structural block diagram of a system of the present invention.

The channel encoder in FIG. 1 adds redundant information into input data to perform coding so as to improve the reliability of transmission; the framer groups output data flow of the channel encoder and adds a prefix character, frame header information and the like in each group of data to form a frame which is the physical layer data transmission basic unit so that the receiving end can accurately, effectively receive; the digital pulse generation and modulation device generates a uniform baseband narrow pulse sequence as the information transmission carrier, and modulates the narrow pulse sequence according to bit stream outputted by the framer, i.e. changing the polarity, amplitude or position of pulse in the sequence to enable the narrow pulse sequences to carry information; the digital pulse sequence outputted by the digital pulse generation and modulation device is amplified by the sending end amplifier and filtered by the sending end bandpass filter, and then is sent into the air via the sending antenna; the signals received by the receiving antenna at the receiving end from the air are filtered by the receiving end bandpass filter and amplified by the low-noise amplifier, and then are converted into digital signals by the analog to digital converter; the analog to digital converter samples, quantizes and encodes the signals, the present invention adopts high speed sampling of several-GHz frequency but only performs low-precision quantification of sample values obtained from each sampling with 1 bit or 2 bits precision; the digital detector performs algorithms of frame detector, synchronization and channel estimation, related detection and the like using digital signals outputted by the analog to digital converter to recover the information bit stream in the frame; and the output of the digital detector is decoded by the channel decoder to obtain output data.

Figure 2:
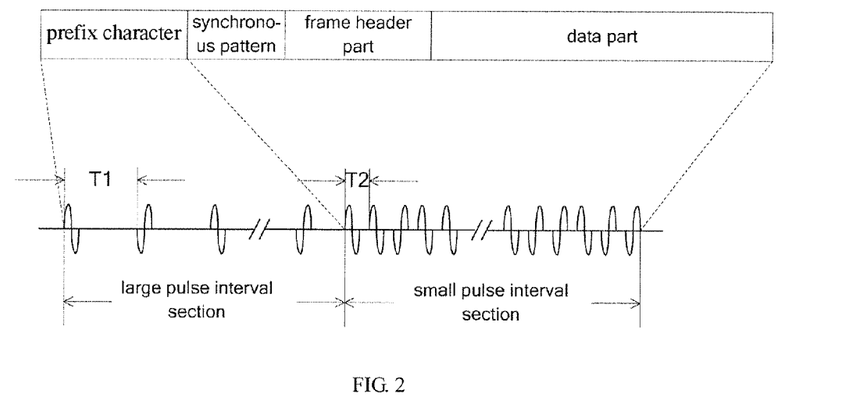
FIG. 2 is a structure diagram of a frame of the present invention.

The frame as the physical layer data transmission basic unit consists of a prefix character, a synchronous pattern, a frame header part and a data part, as shown in FIG. 2. Wherein the pulse interval of the pulse sequences sent by the prefix character part is T1, and the pulse interval of the pulse sequences sent by the other parts is T2; and the value of T1 is larger than the length of an energy main body part of wireless channel impulse response, and the value of T2 is smaller than that of T1 to ensure sufficiently high pulse repetition frequency to obtain high data transmission speed. Accordingly, the prefix character part is a large pulse interval section, and the other parts are small pulse interval sections. Information can be modulated onto a pulse sequence using the modes of pulse polarity modulation, pulse amplitude modulation, pulse position modulation and the like. The pulse polarity modulation uses different pulse polarity indicating signs "1" or "0"; the pulse amplitude modulation uses different pulse amplitude indicating signs "1" or "0"; and the pulse position modulation uses different positions relative to a uniform pulse sequence indicating signs "1" or "0". The following description of the invention adopts the pulse polarity modulation and stipulates the positive pulse indicating sign "1" and the negative pulse indicating sign "0". But the method provided in the present invention is similarly applicable to other pulse modulation modes. The prefix character consists of two parts of pulse sequences, the first part S11={+, −, +, −, . . . , +}, wherein + and − indicate a positive pulse and a negative pulse respectively, and the pulse number is N11 which is an odd number; the second part S12={−, +, −, . . . , +}, and the pulse number is N12; the synchronous pattern is a selected pseudo random positive-negative pulse sequence with the length of N2; the frame header part transmits the information of frame length, channel encoding speed and the like; the data part is sent data information. In the description of the present invention, each pulse of the synchronous pattern, the frame header part and the data part transmits 1 bit information, but a method for transmitting 1 bit information with multiple pulses by adopting the mode of spread spectrum is similarly suitable for the method provided in the present invention.

Figure 3:
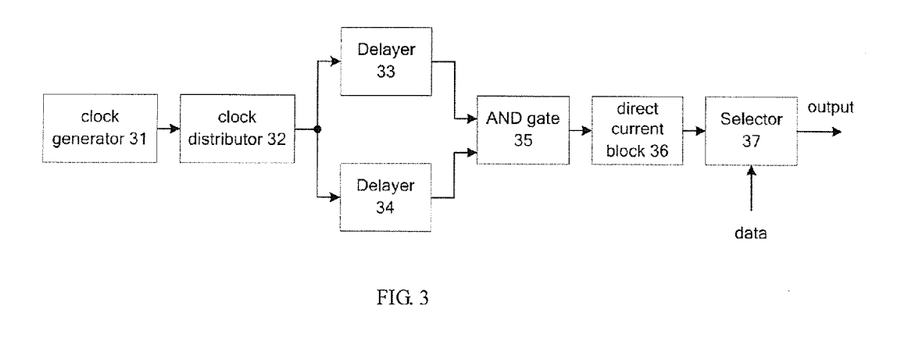
FIG. 3 is an implementation schematic diagram of a digital pulse generation and modulation device 3 adopting an AND method.
Figure 4:
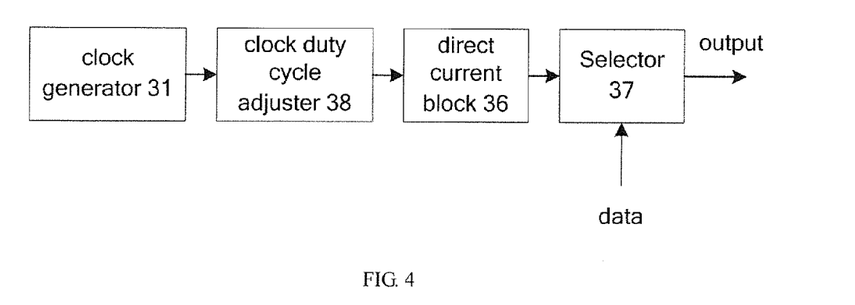
FIG. 4 is an implementation schematic diagram of a digital pulse generation and modulation device 3 adopting a duty cycle adjusting method.

The digital pulse is generated using an AND method by interleaving clock signals or a clock signal duty cycle adjusting method, and FIG. 3 shows an implementation schematic diagram of a digital pulse generation and modulation device for generating a pulse adopting the AND method by interleaving clock signals. FIG. 4 shows an implementation schematic diagram of a digital pulse generation and modulation device for generating a pulse adopting a clock signal duty cycle adjusting method. In the AND method by interleaving clock signals, the clock generator generates a high-frequency clock signal, the clock distributor duplicates the signal into two paths, delayers delay the two paths of clock signals for different times respectively, and the two paths of signals after delay are performing AND at an AND gate. Under ideal conditions, the output of the AND gate is zero if the delay time difference of the two paths is odd times of the length of the semi-pulse period, and the AND gate outputs a pulse sequence having the same period as the clock cycle under other conditions, the duty cycle of the pulse sequence varies with the delay time difference of the two paths, and a pulse sequence with the subnanosecond pulse width is obtained through adjusting the time difference. The pulse sequence outputted by the AND gate is inputted into a DC block to filter the DC component of the pulse sequence. The output pulse sequence of the DC block is a differential signal, the positive and the negative ends of the sequence are simultaneously inputted into a selector which selects one of the positive and the negative ends to output according to input data, for example, selects the positive end to output if the data sign is "1", i.e. outputting the positive pulse, and selects the negative end to output if the data sign is "0", i.e. outputting the negative pulse, so that the pulse polarity modulation of the pulse sequence is implemented. In the clock signal duty cycle adjusting method, a clock duty cycle adjuster directly adjusts the duty cycle of a clock sequence generated by a clock generator, when the duty cycle is very small, i.e. a digital pulse sequence which is a differential signal is obtained, as shown in FIG. 3, the modulated pulse sequence is output after passing through the DC block and the selector. In the present invention, the digital pulse generation and modulation device can be implemented using one of the methods in FIG. 3 and FIG. 4, the output of the digital pulse generation and modulation device is amplified by the sending end amplifier and filtered by the sending end bandpass filter and then a UWB pulse sequence meeting the requirements of frequency spectrum standard can be obtained.

Figure 5:
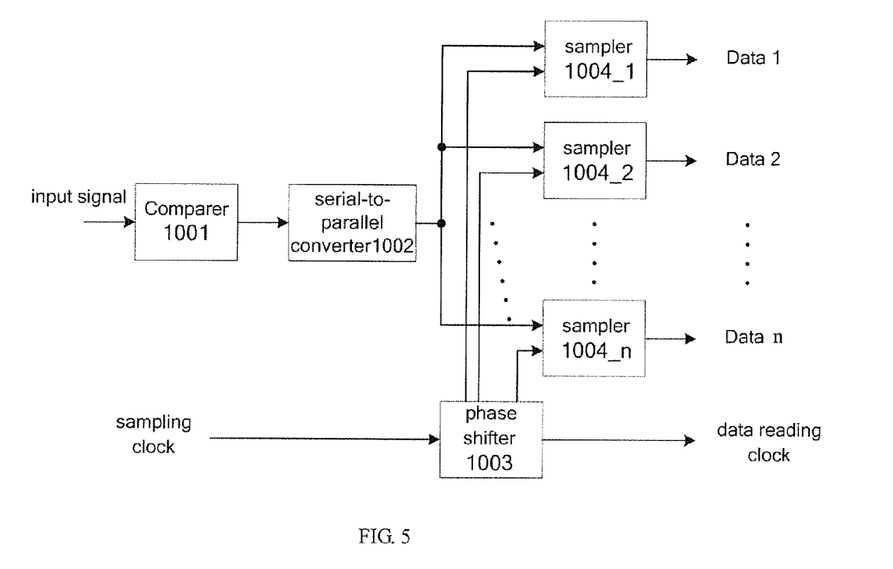
FIG. 5 is an implementation schematic diagram of an analog to digital converter 10 of 1 bit quantification precision.

At the receiving end, the analog to digital converter adopts the mode of high-speed sampling and low-precision quantification. The quantification precision suitable for the present invention is 1 bit or 2 bits. In the description of the receiving method of the present invention, 1 bit quantification precision is adopted, but the receiving method provided in the present invention is similarly suitable for 2 bits quantification precision. As shown in FIG. 5, when 1 bit quantification is adopted, a comparer compares the level of an input signal with the preset threshold level, outputs the high level signal when the input signal level is higher than the threshold level, and outputs the low level signal when the input signal level is lower than the threshold level; the output of the comparer is divided into n branches by a serial-to-parallel converter for sampling to reduce the requirement for sampling speed of each branch.

A sampling clock is input into a phase shifter which outputs n sampling clocks and one data reading clock which have the same frequency as the input clock but different phase positions, the phase difference between sampling clocks of adjacent outputted branches is $2\pi/n$ under general conditions. Samplers sample input signals thereof at the edges of input sampling clocks thereof and simultaneously transmit the read values to follow-up circuits at the edges of data reading clocks. The clock edges of sampling and data reading can be rising edges or falling edges or both.

Digital signals outputted by the analog to digital converter are performing a series of digital processing by the digital detector, including frame detection, synchronization and channel estimation, related detection and the like to recover information bit stream in the frame.

Figure 6:
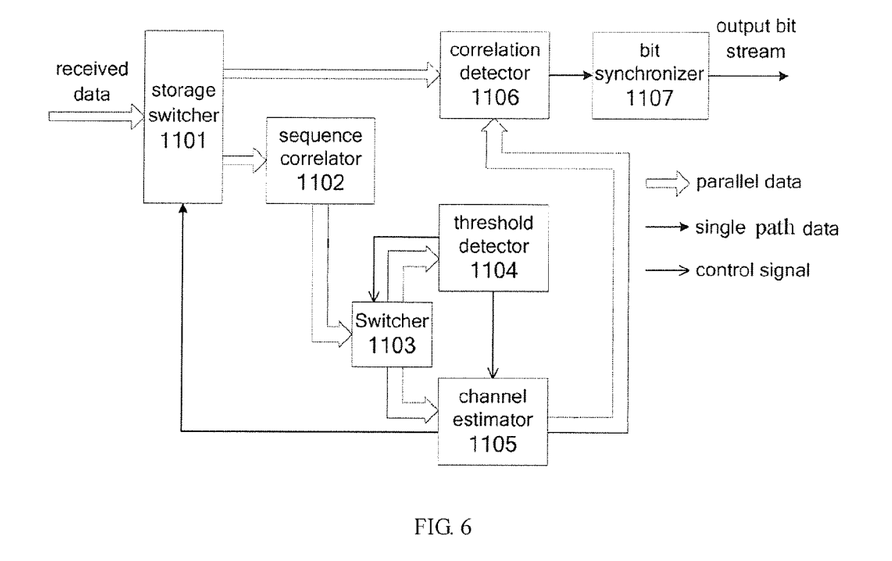
FIG. 6 is a block diagram of a digital detector 11.
Figure 7:
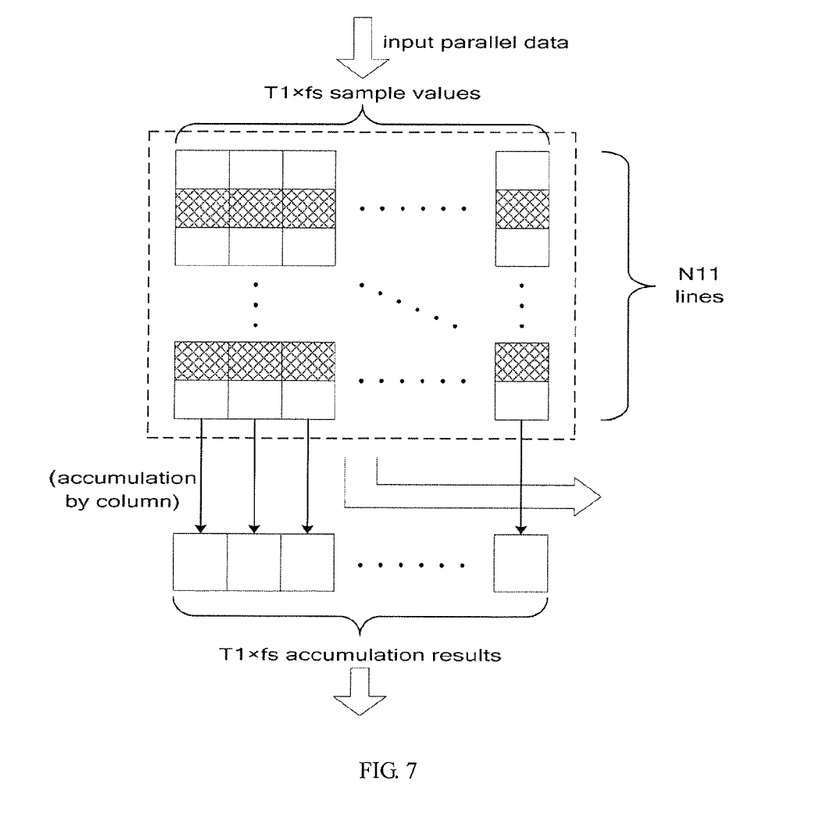
FIG. 7 is a functional schematic diagram of a sequence correlator 1102.

The digital detector consists of a storage switcher, a sequence correlator, a switcher, a threshold detector, a channel estimator, a related detector and a bit synchronizer, as shown in FIG. 6. The storage switcher has the functions of data storage and data flow switching, and firstly outputs received parallel data to the sequence correlator through an internal storage queue; the sequence correlator multiplies received sample values within each pulse interval time T1 by a corresponding pulse sign in the sequence S11 according to the known sequence S11 in the prefix character, and then performs accumulation at the corresponding position within the pulse, the accumulation length is N11 which is the length of the sequence S11, as shown in FIG. 7. In FIG. 7, fs is sampling frequency, so that T1×fs is the number of sample value within each pulse interval time T1. A first-in first-out queue which has N11 lines each storing T1×fs sample values is in a broken line box, the lines with grid shadow indicate that the data of the lines are multiplied by −1, and the lines without grid shadow indicate that the data of the lines keep unchanged. Input data pass through the queue, the data in the lines with the grid shadow are multiplied by −1 and then are accumulated by column in the queue to obtain T1×fs changeable accumulation values which are outputted to a follow-up module. The output of the sequence correlator is firstly outputted to the threshold detector via the switcher, the threshold detector compares the accumulation results outputted by the sequence correlator with the preset threshold value, sends control information to the switcher and the channel estimator to switch the data flow outputted by the sequence correlator to the channel estimator and start up the channel estimator when detecting that the results exceed the threshold, the channel estimator finds the maximum in the input data with the set length thereof as the reference point of channel impulse response and outputs T1×fs sample values as the results of channel estimation to output to the correlation detector by rolling back Nb sample values from the reference point to be as the starting point. Meanwhile, the position where the maximum of channel estimation is found is outputted to the storage switcher which calculates the starting position of the synchronous pattern in the storage queue thereof according to the position and outputs the data starting from the position to the related detector for processing, the related detector performs correlation operation of data received from the storage switcher and channel estimation results received from the channel estimator to obtain estimation of data signs transmitted by each transmission pulse; and the bit synchronizer searches the known synchronous pattern in the output of the related detector to determine the starting position of the data part in the frame to finish the bit synchronization; determines failing to receive the frame if the synchronous pattern is not found within a predetermined time, and restarts the receiving of a new frame.

Beneficial effect: The pulse system high-speed UWB wireless communication method provided in the present invention can implement high-speed wireless communication with lower system cost and power consumption. Compared with the conventional carrier system UWB wireless communication technology, the method provided in the present invention does not need complicated radio frequency processing such as orthogonal modulation/demodulation and frequency spectrum shifting, the quantification precision of analog to digital conversion is greatly reduced, so that the cost and the power consumption are greatly reduced; and compared with the conventional pulse system UWB wireless communication technology, the method provided in the present invention adopts advanced digital receiving processing technology, can enhance data transmission speed from several hundred kbps to 100 Mbps, and improves the stability, reliability and integration. The present invention has significance in development of UWB technology and progress of short-distance wireless communication technology.

DESCRIPTION OF DETAILED EMBODIMENTS

An embodiment of the present invention for implementing a wireless communication system with the maximal instantaneous transmission speed reaching up to 110 Mbps is elaborated as follows.

The entire structure block diagram of the system is shown in FIG. 1. A channel encoder 1 in the FIG. adds redundant information into input data for encoding to improve the transmission reliability; a framer 2 groups the output data flow of the channel encoder 1 and adds a prefix character, frame header information and the like into each group of data to form a frame which is the physical layer data transmission basic unit so that a receiving end can accurately, effectively receive; a digital pulse generation and modulation device 3 generates a uniform baseband narrow pulse sequence as the carrier of information transmission and modulates the narrow pulse sequence according to the bit stream outputted by the framer 2, i.e. changing the polarity, amplitude or position of the pulse in the sequence to enable the narrow pulse sequence to carry information; the digital pulse sequence outputted by the digital pulse generation and modulation device 3 is amplified by a sending end amplifier 4 and filtered by a sending end bandpass filter 5, and then is sent to the air via a sending antenna 6; at the receiving end, a receiving antenna 7 receives signals from the air, the signals are filtered by a receiving end bandpass filter 8 and amplified by a low-noise amplifier 9, and then are converted into digital signals by an analog to digital converter 10; the analog to digital converter 10 performs sampling, quantification and encoding of the signals, and the present invention adopts high speed sampling of several-GHz frequency but only performs low-precision quantification of sample values obtained from each sampling with 1 bit or 2 bits precision; a digital detector 11 performs the algorithms of frame detector, synchronization and channel estimation, related detection and the like using digital signals outputted by the analog to digital converter 10 to recover the information bit stream in the frame; and the output of the digital detector 11 is decoded by the channel decoder to obtain output data.

The channel encoder 1 adopts a low density parity-check (LDPC) code encoder and supports the encoding speed of ⅚, ¾, ⅔ and ½, and the code block length after encoding is 2304 bits.

The frame structure is shown in FIG. 2. A frame consists of a prefix character, a synchronous pattern, a frame header part and a data part. Wherein the pulse interval of the pulse sequences sent by the prefix character part is T1, T1=60.6 ns; the pulse interval of the pulse sequences sent by the other parts is T2, and T2=7.58 ns. The value of T1 is larger than the length of the energy main body part of wireless channel impulse response, and the value of T2 is smaller than that of T1 to ensure sufficiently high pulse repetition frequency to obtain high data transmission speed. Accordingly, the prefix character part is a large pulse interval section, and the other parts are small pulse interval sections. Information can be modulated onto a pulse sequence using the pulse polarity modulation. The pulse polarity modulation uses different pulse polarity indicating signs "1" or "0".

The prefix character consists of two parts of pulse sequences, the first part S11={+, −, +, −, . . . , +}, where + and − indicate a positive pulse and a negative pulse respectively, and the pulse number is N11, and N11=1023; and the second part S12={−, +, −, . . . , +}, the pulse number is N12, and N12=10. The synchronous pattern is a selected pseudo random positive-negative pulse sequence with the length of N2=16. The frame header part transmits the information of frame length, channel encoding speed and the like. The frame header part consists of a physical layer frame header, a media access control (MAC) layer frame header and a frame header check sequence (HCS), wherein the physical layer frame header has the length of 24 bits and contains the information of encoding speed, the length of the data part, the initial value of scamble and the like; the MAC layer frame header has the length of 80 bits and contains the information of frame control, destination address, source address, frame sequence control, access control and the like; the HCS part has the length of 16 bits, and transmits check sequences generated by cyclic redundancy check (CRC) of the physical layer frame header and the MAC frame header. The data part is sent data information. The data part consists of a transmission load and a frame check sequence (FCS), wherein the load part has a variable length and corresponds to encoding sequences of 5/6, 3/4, 2/3 and 1/2, and the maximal lengths of the load part are 2876, 2396, 2156, 1916 and 1436 bytes respectively; the FCS part has the length of 32 bits, and transmits check sequences generated by CRC of the load part. Each pulse of the synchronous pattern, the frame header part and the data part transmits 1 bit information.

At the sending end, the generation of a digital pulse can be implemented using multiple methods. FIG. 3 shows the implementation schematic diagram of a digital pulse generation and modulation device 3 for generating a pulse adopting an AND method by interleaving clock signals. FIG. 4 shows an implementation schematic diagram of the digital pulse generation and modulation device 3 for generating a pulse adopting a clock signal duty cycle adjusting method. In FIG. 3, a clock generator 31 generates a high-frequency clock signal, a clock distributor 32 duplicates the signal into two paths, a delayer 33 and a delayer 34 delay the two paths of clock signals for different times respectively, and the two paths of signals after delay are performed AND at an AND gate 35. Under ideal conditions, the output of the AND gate 35 is zero if the delay time difference of the two paths is odd times of the length of the semi-pulse period; and the AND gate 35 outputs a pulse sequence having the same period as the clock cycle under other conditions, the duty cycle of the pulse sequence varies with the delay time difference of the two paths, and a pulse sequence with the subnanosecond pulse width is obtained through adjusting the time difference. The pulse sequence outputted by the AND gate 35 is inputted into a DC block 36 to filter the DC component of the pulse sequence. The output pulse sequence of the DC block 36 is a differential signal, the positive and the negative ends of the sequence are simultaneously inputted into a selector 37, and the selector 37 selects one of the positive and the negative ends to output according to input data, for example, selects the positive end to output if the data sign is "1", i.e. outputting the positive pulse, and selects the negative end to output if the data sign is "0", i.e. outputting the negative pulse, so that the pulse polarity modulation of the pulse sequence is implemented. In FIG. 4, a clock duty cycle adjuster 38 directly adjusts the duty cycle of the clock sequence generated by the clock generator 31 to obtain a pulse sequence which is a differential signal when the duty cycle is very small, as shown in FIG. 3, and outputs the modulated pulse sequence after passing through the DC block 36 and the selector 37. In the present invention, the digital pulse generation and modulation device 3 can be implemented using one of the methods in FIG. 3 and FIG. 4, the output of the digital pulse generation and modulation device is amplified by a sending end amplifier 4 and filtered by a sending end bandpass filter 5 and then a UWB pulse sequence meeting the requirements of frequency spectrum standard can be obtained. The sending end bandpass filter 5 has the pass band frequency range of 4.2-4.8 GHz.

At the receiving end, a receiving end bandpass filter 8 has the pass band frequency range of 4.2-4.8 GHz. Signals received by a receiving antenna 7 are filtered by the receiving end bandpass filter 8 and amplified by a low-noise amplifier 9, and then an analog to digital converter 10 performs high-speed sampling and low-precision quantification of analog signals with 1 bit quantification precision. The analog to digital converter 10 of 1 bit quantification precision can be implemented using the principle shown in FIG. 5. In FIG. 5, the threshold level of a comparer 1001 is zero. The comparer 1001 compares the input signal level with the preset threshold level, outputs the high level signal when the input signal level is higher than the threshold level, and outputs the low level signal when lower than the threshold level. The output of the comparer 1001 is divided into n=16 branches by a serial-to-parallel converter 1002 for sampling to reduce the requirement for sampling speed of each branch, the sampling clock frequency is 264 MHz, and therefore the total sampling speed is 4224 MHz. The sampling clock is inputted into a phase shifter 1003 which outputs n sampling clocks and one data reading clock which have the same frequency but different phase positions as the inputted clock, and the phase difference between sampling clocks of adjacent outputted branches is $\pi/8$. Samplers 1004_1 to 1004_n sample input signals thereof at the edges of input sampling clocks thereof and simultaneously transmit the read values to follow-up circuits at the edges of data reading clocks. The edges of sampling and data reading clocks can be rising edges or falling edges or both.

The digital signals output by the analog to digital converter 10 are performed a series of digital processing by the digital detector 11, including frame detection, synchronization and channel estimation, related detection and the like to recover the information bit stream in the frame.

A block diagram of the digital detector is shown in FIG. 6. In FIG. 6, a storage switcher 1101 has the function of data storage and data flow switching, and firstly outputs received parallel data to a sequence correlator 1102 through an internal storage queue. A sequence correlator 1102 multiplies the received sample values within each pulse interval time T1 by a corresponding pulse sign in the sequence S11 according to the known sequence S11 in the prefix character, and then performs accumulation at the corresponding position within the pulse and the length of accumulation is N11, as shown in FIG. 7. In FIG. 7, fs is sampling frequency, and fs=4224 MHz. Accordingly, T1×fs=256 is the number of sample value within each pulse interval time T1. A first-in first-out queue which has N11 lines each storing 256 sample values is in a broken line box, the lines with grid shadow indicate that the data of the lines are multiplied by −1, and the lines without grid shadow indicate that the data of the lines keep unchanged. Input data pass through the queue, the data in the lines with the grid shadow are multiplied by −1 and then are accumulated by column in the queue to obtain 256 changeable accumulation values which are outputted to a follow-up module. The output of the sequence correlator 1102 is firstly outputted to a threshold detector 1104 via a switcher 1103. The threshold detector 1104 compares the accumulation results outputted by the sequence correlator 1102 with the preset threshold value which is 100, sends control information to the switcher 1103 and the channel estimator 1105 to switch the data flow outputted by the sequence correlator 1102 to the channel estimator 1105 and start up the channel estimator 1105 when detecting that the results exceed the threshold. The channel estimator 1105 finds the maximum in the input data with the set length of 1023 as the reference point of channel impulse response and outputs 256 sample values as the results of channel estimation to output to the correlation detector 1106 by rolling back Nb=5 sample values from the reference point to be as the starting point. Meanwhile, the position where the maximum of channel estimation is found is outputted to a storage switcher 1101. The storage switcher 1101 calculates the starting position of the synchronous pattern in the storage queue thereof according to the position and outputs the data starting from the position to a correlation detector 1106 for processing. The correlation detector 1106 performs correlation operation of data received from the storage switcher 1101 and channel estimation results received from the channel estimator 1105 to obtain estimation of data signs transmitted by each transmission pulse. A bit synchronizer 1107 searches the known synchronous pattern in the output of the correlation detector 1106. if the synchronous pattern is found, determine the starting position of the data part in the frame according to the position of the synchronous pattern to finish the bit synchronization; if the synchronous pattern is not found within a predetermined time, consider failing to receive the frame and restart the receiving of a new frame.

The channel decoder 12 adopts an LDPC decoder having corresponding parameters to the sending end.

The invention claimed is:

1. A high-speed sampling and low-precision quantification pulse ultra-wideband wireless communication method, comprising the following steps: generating a baseband pulse sequence at a sending end with digital method using a frame as the physical layer data transmission basic unit; modulating the baseband pulse sequence using sending data, and performing amplification and bandpass filtering; sending the signals which are controlled within the frequency band of 4.2-4.8 GHz after filtering into the air via an antenna; filtering and amplifying received signals at a receiving end, then directly performing high-speed sampling and low-precision quantification to convert the signals to digital domains, and designing synchronization, channel estimation and related detection methods suitable for high-speed sampling, low-precision quantification signals to process the signals converted to the digital domains and recover sent information, wherein the sending end consists of a channel encoder (1), a framer (2), a digital pulse generation and modulation device (3), a sending end amplifier (4), a sending end bandpass filter (5) and a sending antenna (6) which are sequentially connected; and the receiving end consists of a receiving antenna (7), a receiving end bandpass filter (8), a low-noise amplifier (9), an analog to digital converter (10), a digital detector (11) and a channel decoder (12) which are sequentially connected, characterized in that the frame as the physical layer data transmission basic unit consists of a prefix character, a synchronous pattern, a frame header part and a data part, wherein the pulse interval of the pulse sequences sent by the prefix character part is T1, and the pulse interval of the pulse sequences sent by the other parts is T2; the value of T1 is larger than the length of an energy main body part of wireless channel impulse response, and the value of T2 is smaller than that of T1 to ensure sufficiently high pulse repetition frequency and obtain high data transmission speed; the prefix character consists of two parts of pulse sequences, the first part $S11=\{+,-,+,-,\ldots,+\}$, wherein + and − indicate a positive pulse and a negative pulse respectively, and the pulse number thereof is an odd number; the second part $S12=\{-,+,-,\ldots,+\}$; and the synchronous pattern is a selected pseudo random positive-negative pulse sequence.

2. A high-speed sampling and low-precision quantification pulse ultra-wideband wireless communication method, comprising the following steps: generating a baseband pulse sequence at a sending end with digital method using a frame as the physical layer data transmission basic unit; modulating the baseband pulse sequence using sending data, and performing amplification and bandpass filtering; sending the signals which are controlled within the frequency band of 4.2-4.8GHz after filtering into the air via an antenna; filtering and amplifying received signals at a receiving end, then directly performing high-speed sampling and low-precision quantification to convert the signals to digital domains, and designing synchronization, channel estimation and related detection methods suitable for high-speed sampling, low-precision quantification signals to process the signals converted to the digital domains and recover sent information, wherein the sending end consists of a channel encoder (1), a framer (2), a digital pulse generation and modulation device (3), a sending end amplifier (4), a sending end bandpass filter (5) and a sending antenna (6) which are sequentially connected; and the receiving end consists of a receiving antenna (7), a receiving end bandpass filter (8), a low-noise amplifier (9), an analog to digital converter (10), a digital detector (11) and a channel decoder (12) which are sequentially connected, characterized in that the digital pulse is generated using an AND method by interleaving clock signals or a clock signal duty cycle adjusting method; in the AND method by interleaving clock signals, a clock generator (31) generates a high frequency clock signal, a clock distributor (32) duplicates the signal into two paths, a delayer (33) and a delayer (34) delay the two paths of clock signals for different times respectively, and the two paths of signals after delay are carried out AND at an AND gate (35); and in the clock signal duty cycle adjusting method, a clock duty cycle adjuster (38) directly adjusts the duty cycle of a clock sequence generated by the clock generator (31), and a digital pulse sequence is obtained when the duty cycle is very small.

3. A high-speed sampling and low-precision quantification pulse ultra-wideband wireless communication method, comprising the following steps: generating a baseband pulse sequence at a sending end with digital method using a frame as the physical layer data transmission basic unit; modulating the baseband pulse sequence using sending data, and performing amplification and bandpass filtering; sending the signals which are controlled within the frequency band of 4.2-4.8 GHz after filtering into the air via an antenna; filtering and amplifying received signals at a receiving end, then directly performing high-speed sampling and low-precision quantification to convert the signals to digital domains, and designing synchronization, channel estimation and related detection methods suitable for high-speed sampling, low-precision quantification signals to process the signals converted to the digital domains and recover sent information, wherein the sending end consists of a channel encoder (1), a framer (2), a digital pulse generation and modulation device (3), a sending end amplifier (4), a sending end bandpass filter (5) and a sending antenna (6) which are sequentially connected; and the receiving end consists of a receiving antenna (7), a receiving end bandpass filter (8), a low-noise amplifier (9), an analog to digital converter (10), a digital detector (11) and a channel decoder (12) which are sequentially connected, wherein, the analog to digital converter (10) adopts the mode of high-speed sampling and low-precision quantification; when 1 bit quantification is adopted, a comparer (101) compares the level of an input signal with a preset threshold level, outputs the high level signal when the input signal level is higher than the threshold level, and outputs the low level signal when the input signal level is lower than the threshold level; the output of the comparer (1001) is divided into n branches by a serial-to-parallel converter (1002) for sampling, a sampling clock is inputted into a phase shifter (1003) which outputs n sampling clocks and one data reading clock which have the same frequency but different phase positions as the input clock; and samplers (1004_1-1004_n) sample input signals thereof at the edges of the input sampling clocks thereof and simultaneously transmit the read values to a follow-up circuit at the edges of the data reading clock.

4. A high-speed sampling and low-precision quantification pulse ultra-wideband wireless communication method, comprising the following steps: generating a baseband pulse sequence at a sending end with digital method using a frame as the physical layer data transmission basic unit; modulating the baseband pulse sequence using sending data, and performing amplification and bandpass filtering; sending the signals which are controlled within the frequency band of 4.2-4.8 GHz after filtering into the air via an antenna; filtering and amplifying received signals at a receiving end, then directly performing high-speed sampling and low-precision quantification to convert the signals to digital domains, and designing synchronization, channel estimation and related detection methods suitable for high-speed sampling, low-precision quantification signals to process the signals converted to the digital domains and recover sent information, wherein the sending end consists of a channel encoder (1), a framer (2), a digital pulse generation and modulation device (3), a sending end amplifier (4), a sending end bandpass filter (5) and a sending antenna (6) which are sequentially connected; and the receiving end consists of a receiving antenna (7), a receiving end bandpass filter (8), a low-noise amplifier (9), an analog to digital converter (10), a digital detector (11) and a channel decoder (12) which are sequentially connected, wherein a digital detector (11) consists of a storage switcher (1101), a sequence correlator (1102), a switcher (1103), a threshold detector (1104), a channel estimator (1105), a correlation detector (1106) and a bit synchronizer (1107); the storage switcher (1101) has the function of data storage and data flow switching, firstly outputs received parallel data to the sequence correlator (1102) through an internal storage queue; the sequence correlator (1102) multiplies the received sample values within each pulse interval time T1 by a corresponding pulse sign in the sequence S11 according to the known sequence S11 in the prefix character, then perform accumulation at the corresponding position within the pulse, and the accumulation length is the length of the sequence S11, and the output of the sequence correlator (1102) is firstly outputted to the threshold detector (1104) via the switcher (1103), the threshold detector (1104) compares the accumulation results outputted by the sequence correlator (1102) with the preset threshold and sends control information to the switcher (1103) and the channel estimator (1105) when detecting the results exceed the threshold to switch data flow outputted by the sequence correlator (1102) to the channel estimator (1105) and start up the channel estimator (1105), the channel estimator (1105) finds the maximum from the input data of the set length to be as the reference point of channel impulse response, and outputs T1×fs sample values as the result of channel estimation to output to the correlation detector (1106) by rolling back Nb sample values from the reference point to be as the starting point; meanwhile, the position where the maximum of channel estimation is found is further outputted to the storage switcher (1101) which calculates the starting position of the synchronous pattern in the storage queue thereof according to the position and outputs data starting from the position to the correlation detector (1106) for processing, the correlation detector (1106) performs correlation operation of the data received from the storage switcher (1101) and the channel estimation results received from the channel estimator (1105) to obtain the estimation of data signs transmitted by each transmitted pulse; and the bit synchronizer (1107) searches the known synchronous pattern from the output of the correlation detector (1106) to determine the starting position of the data part of the frame.

\* \* \* \* \*

UNITED STATES PATENT AND TRADEMARK OFFICE
CERTIFICATE OF CORRECTION

PATENT NO.       : 8,630,329 B2                                                                 Page 1 of 1
APPLICATION NO.  : 13/498576
DATED            : January 14, 2014
INVENTOR(S)      : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 10 days.

Signed and Sealed this
Twenty-second Day of September, 2015

Michelle K. Lee
*Director of the United States Patent and Trademark Office*